US012297695B2

(12) United States Patent
Van Rhijn

(10) Patent No.: US 12,297,695 B2
(45) Date of Patent: May 13, 2025

(54) ADJUSTING MECHANISM FOR A ROLLER BLIND

(71) Applicant: Domicet Oy, Kaarina (FI)

(72) Inventor: Edgard Anton Van Rhijn, Kaarina (FI)

(73) Assignee: DOMICET OY, Kaarina (FI)

( * ) Notice: Subject to any disclaimer, the term of this patent is extended or adjusted under 35 U.S.C. 154(b) by 404 days.

(21) Appl. No.: 17/831,650

(22) Filed: Jun. 3, 2022

(65) Prior Publication Data

US 2023/0392440 A1 Dec. 7, 2023

(51) Int. Cl.
*E06B 9/42* (2006.01)

(52) U.S. Cl.
CPC .................................... *E06B 9/42* (2013.01)

(58) Field of Classification Search
CPC ..... E06B 9/42; E06B 9/44; E06B 9/90; E06B 9/322
USPC ........................................ 160/259, 245, 260
See application file for complete search history.

(56) References Cited

U.S. PATENT DOCUMENTS 11,008,807 B2 * 5/2021 Chen ......................... E06B 9/44
2015/0059992 A1 * 3/2015 Liu ........................... E06B 9/80 160/313
2018/0334854 A1 * 11/2018 Chen ..................... F16F 9/3278
2019/0063151 A1 * 2/2019 Chen .......................... E06B 9/78
2019/0376340 A1 * 12/2019 Smith ........................ E06B 9/88
2020/0109600 A1 * 4/2020 Jang ........................... E06B 9/42
2020/0141183 A1 * 5/2020 Jang ........................... E06B 9/50
2021/0238922 A1 * 8/2021 Schorling ............... F16D 59/00
2022/0056761 A1 * 2/2022 Qiu ............................ E06B 9/62

* cited by examiner

*Primary Examiner* — Beth A Stephan

(74) *Attorney, Agent, or Firm* — Schmeiser, Olsen & Watts LLP

(57) ABSTRACT

An adjusting mechanism for a roller blind is provided, including an adjusting wheel, a carrier, a transfer element comprising connecting means for connecting to an end plug and coil spring, and a friction element at one end abutting the carrier and at another end abutting the adjusting wheel. The adjusting wheel is connected to the transfer element and rotatable around at least part of the carrier and friction element. Rotation of the adjusting wheel causes rotation of the transfer element, and the friction element is arranged to resist rotation of the transfer element. The friction element can be a torsion spring that at least partly surrounds and clamps the carrier, while the adjusting wheel includes at least one protrusion protruding inwardly in a direction towards the carrier. Rotation of the adjusting wheel relieves friction of the torsion spring and rotates the transfer element.

15 Claims, 3 Drawing Sheets

ADJUSTING MECHANISM FOR A ROLLER BLIND

FIELD OF TECHNOLOGY

The following relates to an adjusting mechanism for a roller blind. The following also relates to a roller blind.

BACKGROUND

Roller blinds are a type of window covering that comprise a shade wrapped around a hollow roller. The shade is usually a flexible fabric, and which can be lowered and raised by rotation of the roller and subsequent winding of the shade on and off the roller. Multiple types of roller blinds can be distinguished: chain operated roller blinds, spring operated roller blinds, and pull up roller blinds.

The shade of a chain operated roller blind can be pulled upwards and downwards via an endless chain. The chain is typically present on either side of the roller blind and contains a series of beads. In operation, the chain runs through a clutch which rotates the hollow roller when either side of the chain is pulled. The beads ensure that the chain does not slip through the clutch. Pulling one side of the endless chain lowers the shade, while pulling the other side of the chain raises the shade.

Spring operated roller blinds comprise a hollow roller wherein a coil spring is located. The coil spring typically extends in a tube or around a rod. In the case of a rod, the spring is at one end attached to a side of an outer part of an end plug. The rod itself is fixed on the same side to an inner part of the end plug. The inner part of the end plug is rotatable inside, and with respect to, the outer part of the end plug. The outer part of the end plug is securely fixed within the roller. In this configuration, the coil extends along the outside of the rod and is at one end fixed to the outer part of the end plug, while the other end of the spring is fixed to an end of the rod at a distance from the end plug.

The other configuration, wherein the coil spring extends in a tube, encompasses the same end plug and coil spring as the configuration having a rod described above. The tube itself is attached at one side to the outer part of the end plug. The coil spring extends throughout the tube and is at one end attached to the inner part of the end plug, while it is attached at the other opposite end to the end of the tube, at a distance from the end plug.

Both the tube and rod configuration of the spring-operated roller blinds allow to adjust torsion adjustment in the coil spring by rotating the inner part of the end plug with respect to the outer part.

Pull up roller blinds are a variant of spring-operated roller blinds, wherein the roller is located near a bottom of a window sill and the shade is pulled up via a cord and pulleys attached to a top of the windowsill.

With reference to spring operated roller blinds, the inner part of the end plug is at one end either directly attached to the coil spring, or indirectly, via a rod. At a side opposite thereof, a protrusion is fixed to the inner part of the end plug. This protrusion typically has a rectangular shape and is hung in a form-fitting rectangular recession of a mounting bracket. As such, the inner part of the end plug is not rotatable with respect to the mounting bracket.

When pulling the shade away from the roller, the outer part of the end plug rotates along with the roller, while the inner part of the end plug remains stationary. As such, one end of the coil spring is rotated, while the other end remains stationary. The consequence is that torque is applied to the coil spring, and torsion in the coil spring is increased. The shade of the roller now has a tendency to wrap back up around the roller, as the coil spring urges the roller to rotate in a direction opposite to the unwinding direction due to the built-up torsion in the spring. Typically, the roller comprises a locking mechanism, allowing the shade to remain locked in position with respect to the roller after being unwound. A slight pull on the shade subsequently unlocks this mechanism, and the shade is once again wound around the roller.

Spring operated roller blinds are generally manufactured such that the coil spring is provided with a given torsion. If the torsion of the coil spring is too low, an unwound shade will not automatically fully wind back up around the roller when the shade is released. Likewise, a too high torsion results in an unwound shade being wrapped around the roller with excessive force, potentially damaging the shade or roller.

Usage of spring-operated roller blinds leads to a decrease in torsion in the coil spring over time. In order to increase the torsion of the spring to a desired level, the shade is first pulled down to a certain level, where it is locked in position by the locking mechanism. The roller has to be removed from its mounting brackets and the shade has to be manually wrapped around the roller. Thereafter, the roller and shade are reinstalled in the mounting brackets. This torsion adjusting process is cumbersome and can damage the mounting brackets and the roller itself. Large roller blinds can be heavy, and their excessive length further complicates adjusting the torsion in the coil spring in this manner.

There is thus a need to facilitate adjusting the torsion in a coil spring of a roller blind.

SUMMARY

An aspect relates to an adjusting mechanism for a roller blind, comprising an adjusting wheel, a carrier, a transfer element comprising connecting means for connecting to an end plug and coil spring, and a friction element at one end abutting the carrier and at another end abutting the adjusting wheel; wherein the adjusting wheel is connected to the transfer element and rotatable around at least part of the carrier and friction element; wherein rotation of the adjusting wheel causes rotation of the transfer element, and wherein the friction element is arranged to resist rotation of the transfer element.

The friction element resists rotation of the transfer element and as such, prevents unwanted rotation of an inner part of an end plug mounted in a roller of a spring-operated roller blind when the shade is pulled or released. Rotation of the adjusting wheel overcomes the friction force applied by the friction element to the carrier and rotates the transfer element. As such, rotation of the transfer element is transferred to the inner part of the end plug and torsion in a coil spring is adjusted by simply turning the adjusting wheel. The adjusting mechanism thus allows torsion adjustment of a coil spring inside a spring-operated roller blind without having to remove the roller blind from its mounting brackets.

In this respect, a carrier is to be understood as a component that carries or is at least abutting the friction element. A frictional force has to be overcome when the friction element is moved with respect to the carrier. A transfer element is a component that is able to transfer movement from one object to another. In this case, the transfer element is able to transfer a rotating movement of the adjusting wheel to a rotating movement of the inner part of an end plug.

In an embodiment, the friction element is a torsion spring that at least partly surrounds and clamps the carrier. The torsion spring may wrap around the carrier. The carrier can have a circular shape wherein the outer surface of the carrier abuts the inner surface of the coils of the torsion spring. This torsion spring is thus not the coil spring of the spring-operated roller blind, but rather a distinct torsion spring arranged to provide friction between itself and the carrier.

Friction can be increased or decreased by providing a torsion spring having more or fewer coils, respectively. As such, a torsion spring can be chosen that delivers an appropriate amount of friction, depending on the size and weight of the shade of a spring-operated roller blind.

At least one outer end of the torsion spring protrudes outwardly away from the carrier, wherein the adjusting wheel comprises at least one protrusion protruding inwardly in a direction towards the carrier, and wherein the at least one outer end of the torsion spring is engageable with the protrusion of the adjusting wheel. As such, rotation of the adjusting wheel results in the inward protruding protrusion of the adjusting wheel engaging the outwardly protruding outer end of the torsion spring. Subsequently, further rotation of the adjusting wheel decreases torsion in the torsion spring and rotates the torsion spring at the same time. As the transfer element is connected to the adjusting wheel, the transfer element is rotated as well, enabling the adjustment of torsion in the coil spring within a roller blind.

In general, the connection between the adjusting wheel and the transfer element does not have to be a direct connection. The adjusting wheel can be connected to the transfer element via the friction element as well.

In another embodiment, both outer ends of the torsion spring protrude outwardly away from the carrier, wherein the transfer element at least partly surrounds the torsion spring and is engageable with at least one of the protruding outer ends of the torsion spring. In an embodiment, the transfer element is engageable with at least one of the protruding outer ends of the torsion spring in a direction such that torsion in the torsion spring increases when the transfer element abuts and pushes against a protruding outer end of the torsion spring. In general, the transfer element may be configured to push and/or abut against at least one protruding outer end in a direction opposite to a direction wherein the inwardly protruding protrusion of the adjusting wheel pushes and/or abuts against the at least one protruding outer end of the torsion spring. Such a configuration prevents unwanted rotation of the transfer element, while allowing desired rotation of the transfer element via the adjusting wheel.

In addition, or alternatively, the adjusting wheel may comprise a first and a second protrusion protruding inwardly in a direction towards the carrier, wherein a first outer end of the torsion spring is engageable with the first protrusion of the adjusting wheel and wherein a second outer end of the torsion spring is engageable with the second protrusion of the adjusting wheel. This allows the torsion spring and the transfer element to be rotated in both directions by rotating the adjusting wheel either clockwise or counter-clockwise.

In operation, the inwardly protruding protrusions, or knobs, of the adjusting wheel engage or push the outwardly protruding outer ends of the torsion spring in a direction such that torsion in the torsion spring is lowered and frictional forces between the carrier and torsion spring are more easily overcome when turning the adjusting wheel. The transfer element abuts or pushes the outwardly protruding outer ends of the torsion spring from another opposite direction.

The adjusting wheel, the transfer element, and the friction element may all be rotatable with respect to the carrier. This allows adjusting the torsion of a spring-operated roller blind when the transfer element is connected to an inner part of the end plug of the roller blind.

In another embodiment the transfer element comprises a recession for accommodating a pin of the end plug, allowing the rotation of the transfer element to be transferred to the inner part of the end plug. In an embodiment, the recession has a rectangular shape. A rectangular shaped protrusion is a standard shape used in the roller blind industry which can be form-fittingly inserted in the rectangular shaped recession. As such, rotation of the transfer element is reliably transferred to the inner part of the end plug.

In an embodiment, an outer circumferential surface of the adjusting wheel can be profiled. In an embodiment, the outer circumferential surface of the adjusting wheel is corrugated. This enhances the grip on the adjusting wheel and facilitates rotating the adjusting wheel by hand.

In an embodiment, the carrier comprises fixation means for fixing the carrier to a mounting bracket. If the carrier is fixed securely to a mounting bracket, the whole of the adjusting mechanism is prevented from rotating when the shade is unwound from the roller by pulling the shade. Likewise, such a secured carrier does not rotate when the shade once again is wrapped around the roller. Obviously, the mounting bracket is intended to be fixed to a stationary object, such as a wall or window sill. This fixation means may comprise at least one screw hole. In an embodiment the fixation means comprises multiple screw holes and associated screws.

In an embodiment, the fixation means is located on a side of the adjusting mechanism opposite a side of the adjusting mechanism where the recession is located. As the recession is arranged to interact with a protrusion on the inner part of an end plug, a location opposite the recession is convenient for mounting the adjusting mechanism.

Embodiments of the present invention are also providing a roller blind comprising: a hollow roller and a shade at one end connected to the hollow roller, an end plug comprising an inner part and outer part, wherein the inner part is rotatable inside the outer part, and a coil spring connected to the end plug, wherein torsion of the coil spring is adjustable by rotation of the inner part with respect to the outer part, and an adjusting mechanism as outlined above, wherein the end plug is inserted in an outer end of the hollow roller, and wherein the connecting means of the transfer element is connected to the inner part of the end plug. Such a roller blind provides all the advantages as described herein.

In an embodiment, the roller blind comprises mounting brackets, wherein the adjusting mechanism is located in between the roller and a first mounting bracket, wherein the carrier is fixed to the first mounting bracket, wherein the roller is located between the adjusting mechanism and a second mounting bracket, and wherein the roller is rotatably connected to the transfer element and the second mounting bracket.

BRIEF DESCRIPTION

Some of the embodiments will be described in detail, with references to the following Figures, wherein like designations denote like members, wherein.

DETAILED DESCRIPTION

Figure 1:
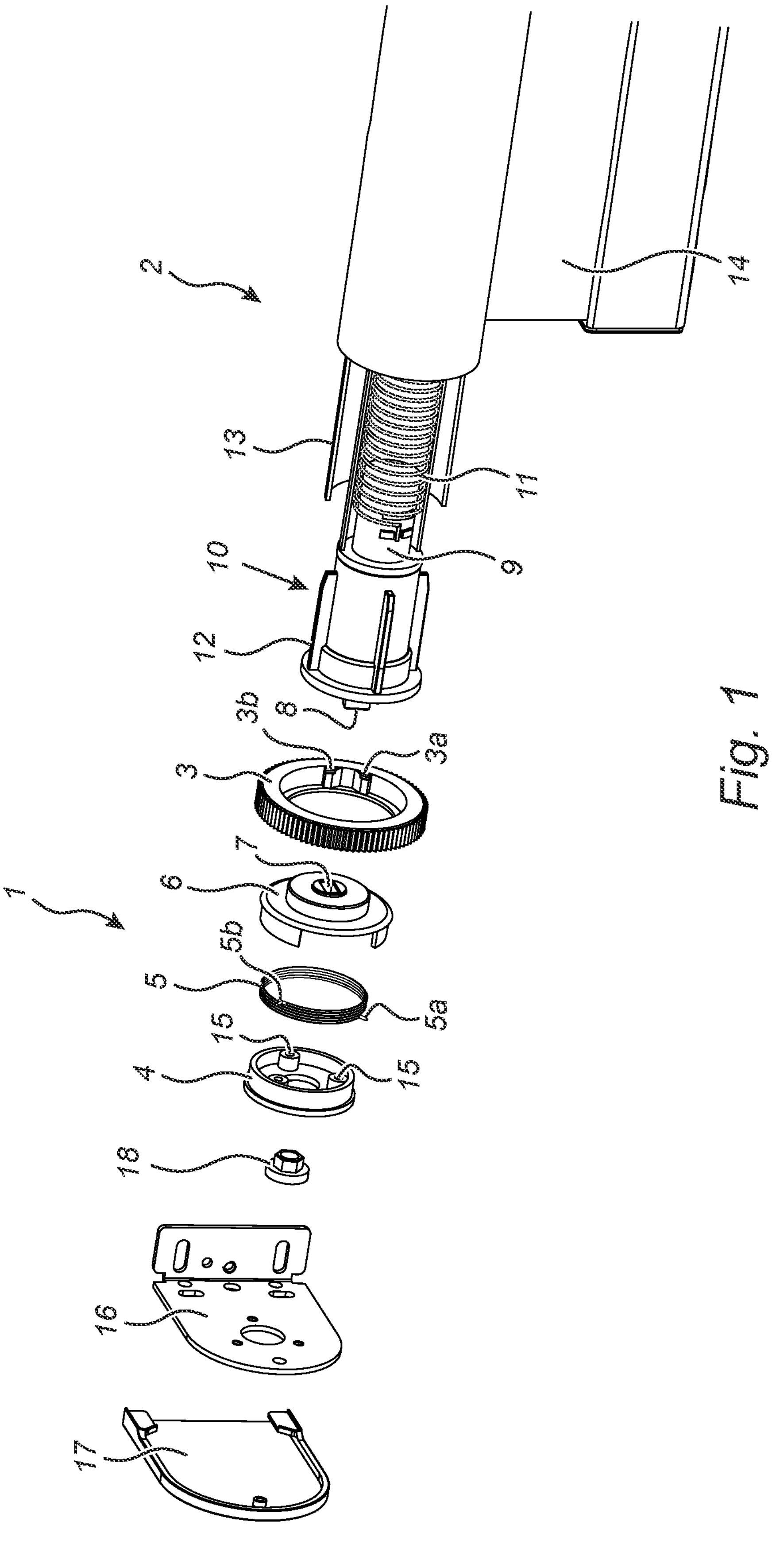
FIG. 1 shows an exploded perspective view of an adjusting mechanism according to embodiments of the present invention together with a mounting bracket and a cut away roller blind.
Figure 2:
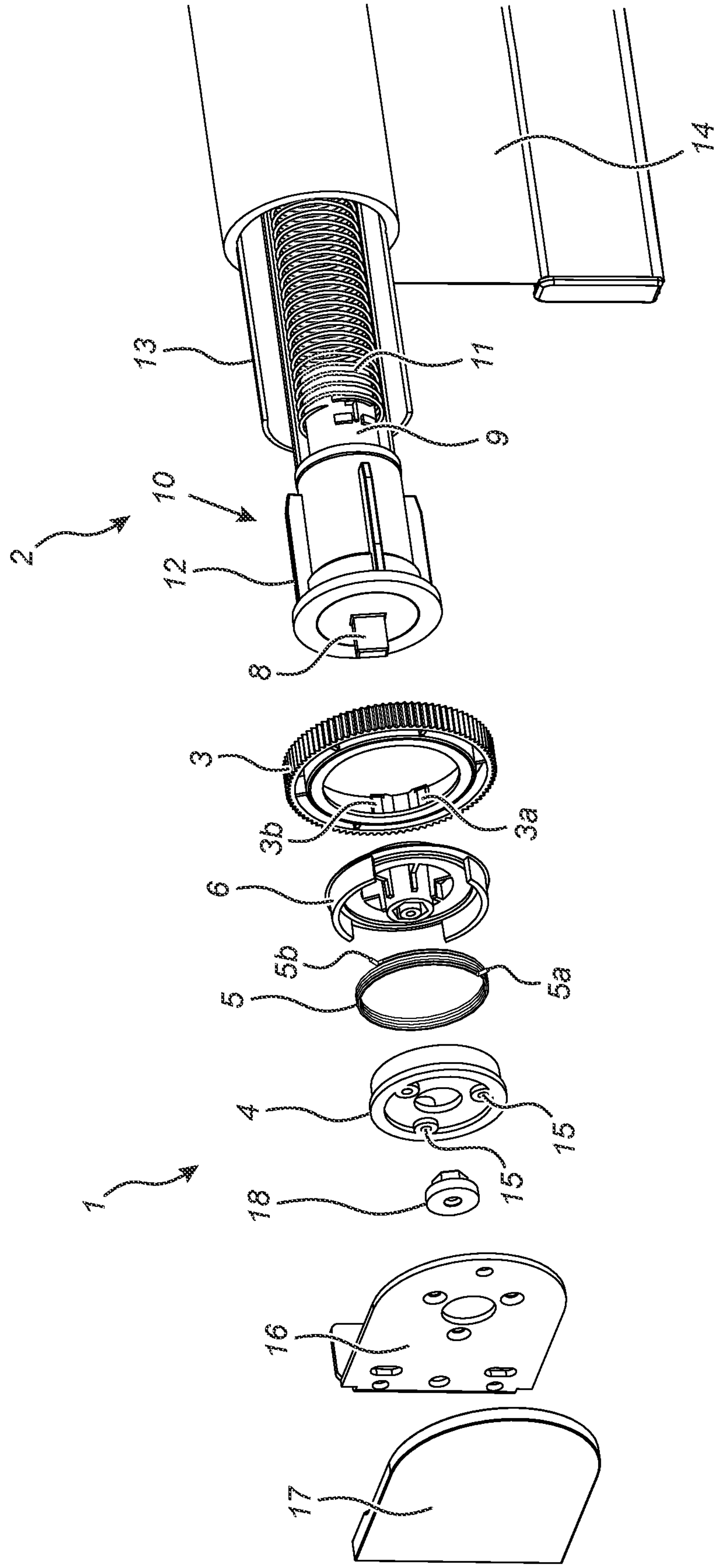
FIG. 2 shows another exploded perspective view of the adjusting mechanism of FIG. 1.

FIG. 1, as well as FIG. 2, show an exploded perspective view of an adjusting mechanism 1 for a spring-operated roller blind 2. The adjusting mechanism 1 comprises an adjusting wheel 3, a carrier 4, a torsion spring 5, and a transfer element 6. When assembled, the torsion spring 5 is fitted around the outer circular circumferential surface of the carrier 4 and clamps and surrounds the carrier 4. In order to rotate the torsion spring 5 around the carrier a frictional force provided by the clamping of the torsion spring 5 has to be overcome. The torsion spring 5 has two protruding outer ends 5*a*, 5*b*. Inwardly protruding protrusions 3*a*, 3*b*, or knobs 3*a*, 3*b*, of the adjusting wheel 3 are able to engage these outer ends 5*a*, 5*b*. The transfer element 6 comprises a recession 7 in the form of a rectangular slot 7. This recession 7 is shaped to accommodate the rectangular protrusion 8, or pin 8, of the inner part 9 of an end plug 10.

When assembled, the transfer element 6 is fitted on the torsion spring 5 and partly surrounds this torsion spring 5. The adjusting wheel 3 is rotatably fitted around the carrier 4, torsion spring 5, and transfer element 6. When the adjusting wheel 3 is rotated, the knobs 3*a*, 3*b* push against the protruding outer ends 5*a*, 5*b* of the torsion spring 5. When the protruding outer ends 5*a*, 5*b* are pushed in the correct direction, torsion in the torsion spring 5 is lowered and friction between the torsion spring 5 and the carrier 4 is reduced. As such, rotation of the torsion spring 5 is facilitated and is transferred to the transfer element 6 by the protruding outer ends 5*a*, 5*b* of the torsion spring 5 engaging the transfer element 6. Subsequently, rotation is further transferred via the recession 7 and pin 8 to the inner part 9 of the end plug 10 and the coil spring 11 attached thereto and torsion in the coil spring 11 is adjusted.

The end plug 10 is attached via its outer part 12 in a roller 13 of the spring-operated roller blind 2. Adjusting the torsion in the coil spring 11 via the adjusting mechanism 1 thus enables adjusting the force required to pull the shade 14 down and the force enacted on the shade 14 when it is pulled up by rotation of the roller 13. The carrier 4 comprises fixation means 15 in the form of screw holes 15 and associated screws (not shown) to fix the carrier 4 to a mounting bracket 16. The mounting bracket is covered with a plate 17 to provide pleasing visual aesthetics. The transfer element 6 can be further fixed rotatably onto the torsion spring 5 via a nut 18.

Figure 3:
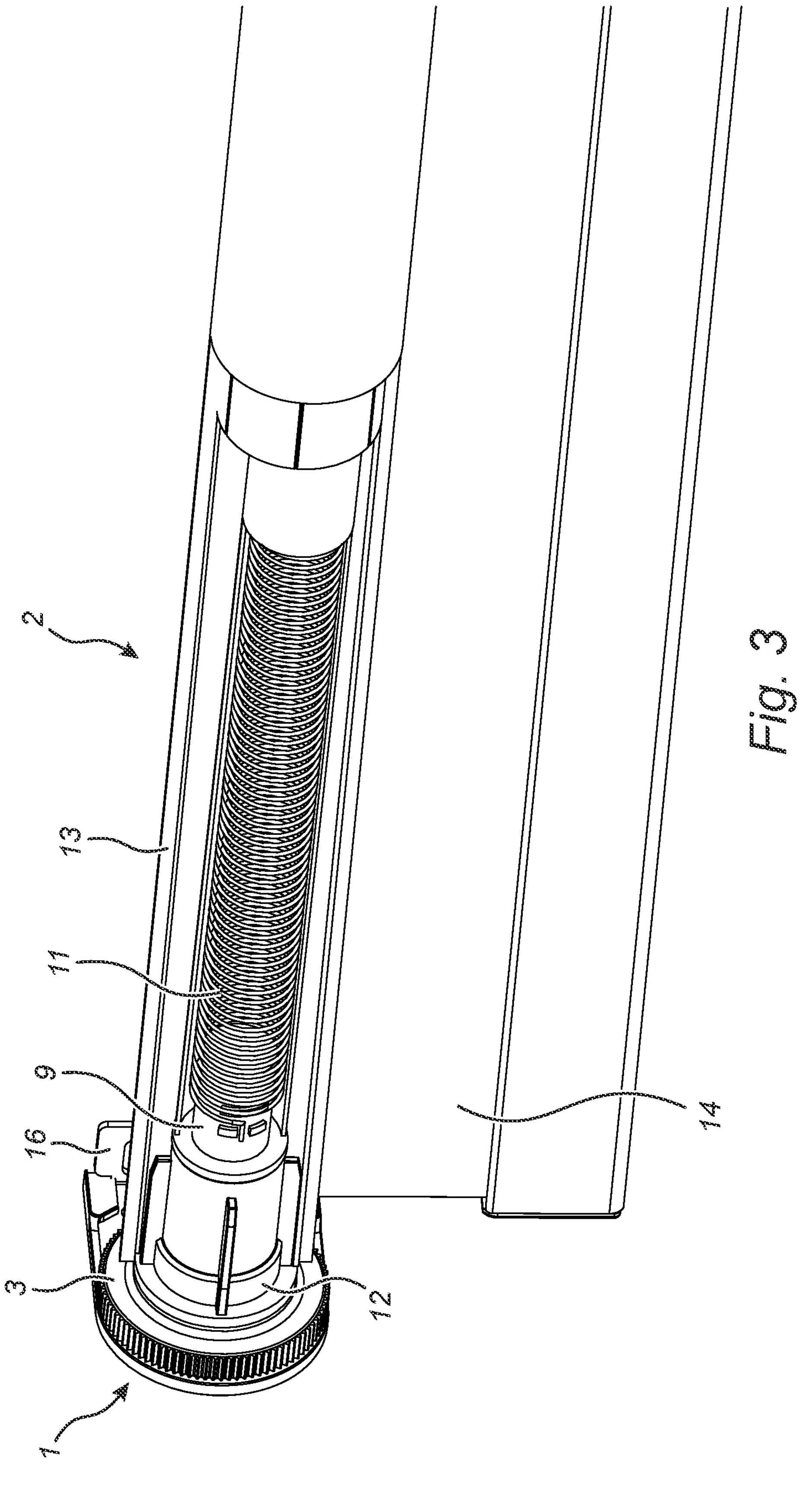
FIG. 3 shows a perspective view of a roller blind including an adjusting mechanism in accordance with embodiments of the present invention.

FIG. 3 shows an assembled spring-operated roller blind 2 with an adjusting mechanism 1 fitted in between the roller 13 and a mounting bracket 16. Another similar mounting bracket 16 (not shown) is fitted on an opposite side of the roller 13, to hold it in place against a window sill or wall. Rotation of the adjusting wheel 3 of the adjusting mechanism 1 enables torsion in the coil spring 11 to be adjusted without having to remove the roller 13 from the mounting brackets 16. As such, the adjusting mechanism 1 greatly facilitates this adjusting process.

Embodiments of the invention will be further elucidated by means of the following non-limitative clauses.

Adjusting mechanism for a roller blind, comprising:
- an adjusting wheel,
- a carrier,
- a transfer element comprising connecting means for connecting to an end plug and coil spring, and
- a friction element at one end abutting the carrier and at another end abutting the adjusting wheel, wherein the adjusting wheel is connected to the transfer element and rotatable around at least part of the carrier and friction element, wherein rotation of the adjusting wheel causes rotation of the transfer element, and wherein the friction element is arranged to resist rotation of the transfer element.

Adjusting mechanism according to clause 1, wherein the friction element is a torsion spring that at least partly surrounds and clamps the carrier.

Adjusting mechanism according to clause 2, wherein at least one outer end of the torsion spring protrudes outwardly away from the carrier, wherein the adjusting wheel comprises at least one protrusion protruding inwardly in a direction towards the carrier, and wherein the at least one outer end of the torsion spring is engageable with the protrusion of the adjusting wheel.

Adjusting mechanism according to clause 3, wherein both outer ends of the torsion spring protrude outwardly away from the carrier, wherein the transfer element at least partly surrounds the torsion spring and is engageable with at least one of the protruding outer ends of the torsion spring.

Adjusting mechanism according to clause 4, wherein the adjusting wheel comprises a first and a second protrusion protruding inwardly in a direction towards the carrier, wherein a first outer end of the torsion spring is engageable with the first protrusion of the adjusting wheel and wherein a second outer end of the torsion spring is engageable with the second protrusion of the adjusting wheel.

Adjusting mechanism according to any of the preceding clauses, wherein the adjusting wheel, the transfer element, and the friction element are all rotatable with respect to the carrier.

Adjusting mechanism according to any of the preceding clauses, wherein the transfer element comprises a recession for accommodating a pin of the end plug.

Adjusting mechanism according to clause 7, wherein the recession has a rectangular shape.

Adjusting mechanism according to any of the preceding clauses, wherein an outer circumferential surface of the adjusting wheel is profiled.

Adjusting mechanism according to clause 9, wherein the outer circumferential surface of the adjusting wheel is corrugated.

Adjusting mechanism according to any of the preceding clauses, wherein the carrier comprises fixation means for fixing the carrier to a mounting bracket.

Adjusting mechanism according to clause 11, wherein the fixation means comprises at least one screw hole.

Adjusting mechanism according to clause 11 or 12, wherein the fixation means is located on a side of the adjusting mechanism opposite a side of the adjusting mechanism where the recession is located.

Roller blind comprising:
- a hollow roller and a shade at one end connected to the hollow roller,
- an end plug comprising an inner part and outer part, wherein the inner part is rotatable inside the outer part, and a coil spring connected to the end plug, wherein torsion of the coil spring is adjustable by rotation of the inner part with respect to the outer part, and an adjusting mechanism according to any of the preceding clauses, wherein the end plug is inserted in an outer end of the hollow roller, and wherein the connecting means of the transfer element is connected to the inner part of the end plug.

Roller blind according to clause 14, comprising mounting brackets, wherein the adjusting mechanism is located in between the roller and a first mounting bracket, wherein the carrier is fixed to the first mounting bracket, wherein the roller is located between the adjusting mechanism and a second mounting bracket, and wherein the roller is rotatably connected to the transfer element and the second mounting bracket.

Although the invention has been illustrated and described in greater detail with reference to the preferred exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. An adjusting mechanism for a roller blind, comprising:

an adjusting wheel;

a carrier;

a transfer element comprising connecting means for connecting to an end plug and coil spring; and a friction element at one end abutting the carrier and at another end abutting the adjusting wheel;

wherein the adjusting wheel is connected to the transfer element and rotatable around at least part of the carrier and the friction element;

wherein rotation of the adjusting wheel causes rotation of the transfer element;

wherein the friction element is arranged to resist rotation of the transfer element.

2. The adjusting mechanism according to claim 1, wherein the friction element is a torsion spring that at least partly surrounds and clamps the carrier.

3. The adjusting mechanism according to claim 2, wherein the torsion spring comprises outer ends, at least one outer end of the torsion spring protrudes outwardly away from the carrier;

wherein the adjusting wheel comprises at least one protrusion protruding inwardly in a direction towards the carrier; and wherein the at least one outer end of the torsion spring is engageable with the protrusion of the adjusting wheel.

4. The adjusting mechanism according to claim 3, wherein the outer ends of the torsion spring protrude outwardly away from the carrier, and the transfer element at least partly surrounds the torsion spring and is engageable with at least one of the protruding outer ends of the torsion spring.

5. The adjusting mechanism according to claim 4, wherein the at least one protrusion of the adjusting wheel comprises a first protrusion and a second protrusion protruding inwardly in a direction towards the carrier, wherein a first of the outer ends of the torsion spring is engageable with the first protrusion of the adjusting wheel and wherein a second of the outer ends of the torsion spring is engageable with the second protrusion of the adjusting wheel.

6. The adjusting mechanism according to claim 1, wherein the adjusting wheel, the transfer element, and the friction element are all rotatable with respect to the carrier.

7. The adjusting mechanism according to claim 1, wherein the transfer element comprises a recession for accommodating a pin of the end plug.

8. The adjusting mechanism according to claim 7, wherein the recession has a rectangular shape.

9. The adjusting mechanism according to claim 1, wherein an outer circumferential surface of the adjusting wheel is profiled.

10. The adjusting mechanism according to claim 9, wherein the outer circumferential surface of the adjusting wheel is corrugated.

11. The adjusting mechanism according to claim 1, wherein the carrier comprises fixation means for fixing the carrier to a mounting bracket.

12. The adjusting mechanism according to claim 11, wherein the fixation means comprises at least one screw hole.

13. The adjusting mechanism according to claim 11, wherein the fixation means is located on a side of the adjusting mechanism opposite a side of the adjusting mechanism where a recession is located.

14. A roller blind comprising:

a hollow roller and a shade at one end connected to the hollow roller;

an end plug comprising an inner part and an outer part, wherein the inner part is rotatable inside the outer part; and a coil spring connected to the end plug, wherein torsion of the coil spring is adjustable by rotation of the inner part with respect to the outer part; and an adjusting mechanism according to claim 1, wherein the end plug is inserted in an outer end of the hollow roller, and wherein the connecting means of the transfer element is connected to the inner part of the end plug.

15. The roller blind according to claim 14, further comprising a first mounting bracket and a second mounting bracket, wherein the adjusting mechanism is located in between the roller and the first mounting bracket;

wherein the carrier is fixed to the first mounting bracket;

wherein the roller is located between the adjusting mechanism and the second mounting bracket; and wherein the roller is rotatably connected to the transfer element and the second mounting bracket.

* * * * *